US006791362B1

(12) United States Patent
Carlson et al.

(10) Patent No.: US 6,791,362 B1
(45) Date of Patent: Sep. 14, 2004

(54) SYSTEM LEVEL HARDENING OF ASYNCHRONOUS COMBINATIONAL LOGIC

(75) Inventors: Roy M. Carlson, Plymouth, MN (US); David O. Erstad, Minnetonka, MN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/731,387

(22) Filed: Dec. 9, 2003

(51) Int. Cl.[7] .............................................. H03K 19/00
(52) U.S. Cl. ............................. 326/93; 326/14; 326/38
(58) Field of Search ............................. 326/14, 37, 38, 326/46, 93–98, 112

(56) References Cited

U.S. PATENT DOCUMENTS

| | | | |
|---|---|---|---|
| 3,783,254 A | * 1/1974 | Eichelberger | 708/100 |
| 4,782,467 A | 11/1988 | Belt et al. | 365/154 |
| 4,805,148 A | 2/1989 | Diehl-Nagle et al. | 365/154 |
| 5,305,463 A | 4/1994 | Fant et al. | 395/800 |
| 5,387,825 A | * 2/1995 | Cantrell et al. | 327/26 |
| 5,406,513 A | 4/1995 | Canaris et al. | 365/181 |
| 5,640,105 A | 6/1997 | Sobelman et al. | 326/36 |
| 5,652,902 A | 7/1997 | Fant | 395/800 |
| 5,656,948 A | 8/1997 | Sobelman et al. | 326/35 |
| 5,664,211 A | 9/1997 | Sobelman et al. | 395/141 |
| 5,664,212 A | 9/1997 | Fant et al. | 395/141 |
| 5,764,081 A | 6/1998 | Fant et al. | 326/63 |
| 5,793,662 A | 8/1998 | Duncan et al. | 364/768 |
| 5,796,962 A | 8/1998 | Fant et al. | 395/306 |
| 5,828,228 A | 10/1998 | Fant et al. | 326/35 |
| 5,896,541 A | 4/1999 | Fant et al. | 395/800.18 |
| 5,907,693 A | 5/1999 | Fant et al. | 395/384 |
| 5,923,194 A | * 7/1999 | Graf, III | 327/144 |
| 5,930,522 A | 7/1999 | Fant | 395/800.25 |
| 5,977,663 A | 11/1999 | Fant et al. | 307/251 |
| 5,986,466 A | 11/1999 | Sobelman et al. | 326/39 |
| 6,020,754 A | 2/2000 | Sobelman et al. | 326/35 |
| 6,031,390 A | 2/2000 | Fant et al. | 326/36 |
| 6,043,674 A | 3/2000 | Sobelman | 326/35 |
| 6,052,770 A | 4/2000 | Fant | 712/14 |
| 6,128,678 A | 10/2000 | Masteller | 710/52 |
| 6,262,593 B1 | 7/2001 | Sobelman et al. | 326/35 |
| 6,278,287 B1 | 8/2001 | Baze | 326/9 |
| 6,292,128 B1 | 9/2001 | Tsui et al. | 342/13 |
| 6,308,229 B1 | 10/2001 | Masteller | 710/52 |
| 6,313,660 B1 | 11/2001 | Sobelman et al. | 326/39 |
| 6,326,809 B1 | 12/2001 | Gambles et al. | 326/46 |
| 6,327,607 B1 | 12/2001 | Fant | 709/201 |
| 6,333,640 B1 | 12/2001 | Fant et al. | 326/35 |
| 6,356,117 B1 | * 3/2002 | Sutherland et al. | 326/93 |
| 6,526,542 B2 | 2/2003 | Kondratyev | 716/2 |
| 6,586,969 B1 | * 7/2003 | Koe | 326/93 |
| 6,700,410 B2 | * 3/2004 | Ebergen | 326/93 |
| 2003/0091038 A1 | 5/2003 | Hagedorn | 370/359 |

OTHER PUBLICATIONS

Maher, Michael, "Radiation Design Considerations Using CMOS Logic," National Semiconductor Application Note 926, Jan. 1994.

"Throw Away the Clock," Theseus Logic—Benefits of NCL—EMI, http://www.theseus.com/_AboutNCL.htm, printed Nov. 19, 2002.

Fant, Karl M. and Scott A. Brandt, "NULL Convention Logic," Theseus Logic: Setting the Standard for Clockless Systems, 1997.

* cited by examiner

*Primary Examiner*—Don Le
(74) *Attorney, Agent, or Firm*—McDonnell Boehnen Hulbert & Berghoff LLP

(57) ABSTRACT

A system and method for hardening an asynchronous combinational logic circuit against Single Event Upset (SEU) is presented. The asynchronous combinational logic circuit is located between two asynchronous registers. A fault detector is used to detect a fault at an output of the asynchronous combinational logic circuit caused by SEU. If the fault detector detects a fault, a first asynchronous register is prevented from clearing stored data and a second asynchronous register is prevented from loading data from the asynchronous combinational logic circuit until the fault is cleared. Further, a timer circuit is used to ensure enough time elapses to allow the asynchronous combinational logic circuit to reevaluate itself. The asynchronous combinational logic circuit reevaluates itself by first propagating a NULL wave front to clear the fault and then propagating the data stored in the first asynchronous register to its outputs.

40 Claims, 8 Drawing Sheets

SYSTEM LEVEL HARDENING OF ASYNCHRONOUS COMBINATIONAL LOGIC

FIELD

The present invention relates generally to asynchronous logic circuits, and more particularly, relates to system level hardening of asynchronous combinational logic circuits.

BACKGROUND

Most digital circuits are synchronous in nature, meaning that a clock signal controls data flow through the circuit. As clock speeds increase, circuit design becomes more complex due to timing requirements. Problems related to high clock speeds include switching noise, peak currents on power rails, and unnecessary power consumption due to the switching noise. As a result of the problems encountered with synchronous circuit design, asynchronous design techniques have received more attention.

One such asynchronous approach is null convention logic (NCL). NCL is a clock-free delay-insensitive logic design methodology for digital systems. NCL uses a combination of multi-wire data representation and a control/signaling protocol. NCL circuits switch between a data representation of DATA and a control representation of NULL. Typically, DATA corresponds to a logic-1 level, while NULL corresponds to a logic-0 level. The separation between data and control representations provides self-synchronization, without the use of a clock signal.

The use of asynchronous circuit designs, such as NCL, may be advantageous in space, weapons, and aviation applications. However, these applications expose circuits to radiation. Radiation may take the form of alpha and energetic particles, as well as in other forms, such as gamma rays. Alpha particles are byproducts of the natural decay of elements. Energetic particles include heavy ions, protons, neutrons, and electrons, which are abundant in space, even at commercial flight altitudes.

Radiation can cause transient disturbances, or glitches, in asynchronous circuit designs. When an energetic particle strikes a transistor region, a parasitic conduction path can be created, which may cause a false transition. The false transition, or glitch, can propagate through the circuit and may ultimately result in the disturbance of a state node containing state information, such as an output of a latch, register, or gate. The disturbance of the state node is commonly referred to as a single event upset (SEU). SEU is a specific class of transient fault. Other sources of transient faults exist and may have similar effects.

The circuit implementation of the basic NCL building block gate uses a latch element that is sensitive to upset due to transient disturbances caused by radiation. Many of these gates may be used in the design of asynchronous combinational logic circuits. Therefore, it would be beneficial to harden an asynchronous combinational logic circuit from the effects of SEU. As a result of hardening, asynchronous combinational logic circuits may be used in applications in which radiation is present.

BRIEF DESCRIPTION OF THE DRAWINGS

Exemplary embodiments are described below in conjunction with the appended drawing figures, wherein like reference numerals refer to like elements in the various figures, and wherein.

DETAILED DESCRIPTION

Figure 1:
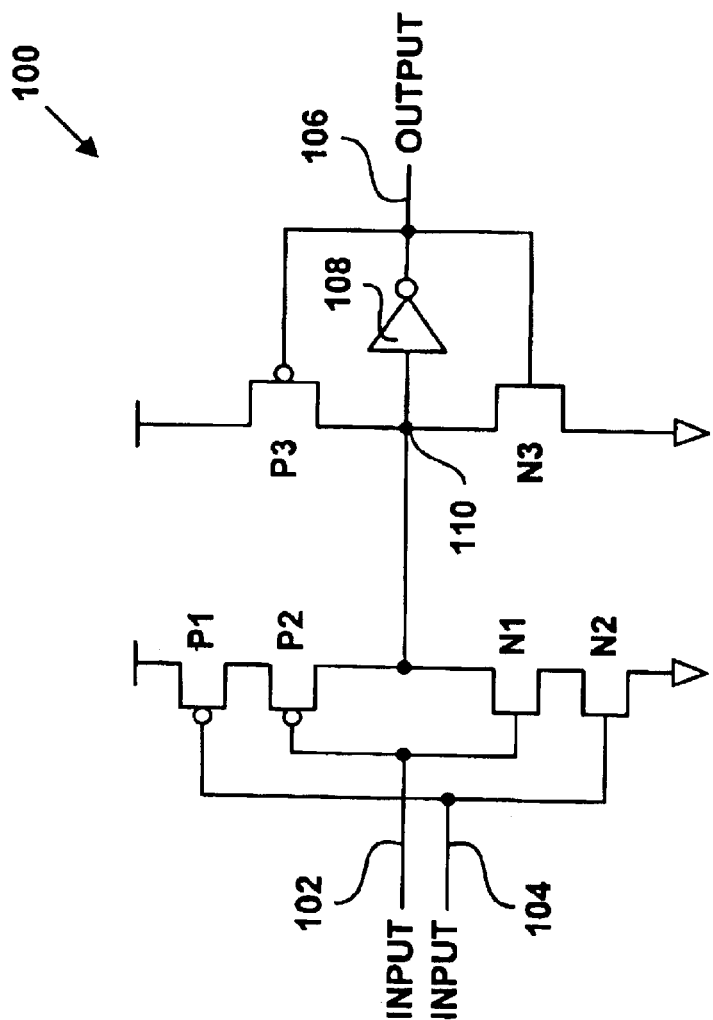
FIG. 1 is a schematic diagram of a typical NCL gate circuit, according to an exemplary embodiment.

FIG. 1 is a schematic diagram of a typical NCL gate circuit 100. The NCL gate circuit 100 shown in FIG. 1 has two inputs 102, 104. However, the NCL gate circuit 100 may have more than two inputs. The inputs 102, 104 can have two possible values, referred to as DATA and NULL. Typically, DATA corresponds to a logic-1 voltage level, while NULL corresponds to a logic-0 voltage level. For example, the logic-1 level may be approximately 5 volts, while the logic-0 level may be approximately 0 volts. However, other mappings of DATA and NULL are possible.

The NCL gate circuit 100 is shown in FIG. 1 as having a single output 106. However, the NCL gate circuit 100 may have more than one output. The output 106 can also have two possible values, DATA and NULL. If the output 106 is in a NULL state, then the output 106 may remain in the NULL state until a specified number of inputs (two inputs in this example) are placed in the DATA state. Once the output 106 is placed in the DATA state, the output 106 may remain in this state until all of the inputs return to the NULL state. The NCL gate circuit 100 is known as a 2-of-2 gate, meaning that 2 out of 2 inputs need to be in the DATA state for the output to be placed in the DATA state.

In this example, the NCL gate circuit 100 has two inputs 102, 104. An output of an NCL circuit with two inputs may remain in the NULL state until both inputs are placed in the DATA state. More specifically, the output 106 may remain in the NULL state until both inputs 102, 104 are placed in the DATA state. Additionally, once the output 106 reaches the DATA state, the output 106 will remain in the DATA state until both inputs 102, 104 are placed in the NULL state.

The NCL gate circuit 100 includes an input driver consisting of four transistors P1, P2, N1, and N2. Additionally, the NCL gate circuit 100 includes feedback transistors P3 and N3. The transistors P1, P2, P3, N1, N2, and N3 are depicted in FIG. 1 as complementary metal-oxide semiconductor (CMOS) transistors; however, other transistor types may be employed. P-type CMOS transistors may be used in a pull-up network (e.g., P1, P2, and P3). N-type CMOS transistors may be used in a pull-down network (e.g., N1, N2, and N3).

The NCL gate circuit 100 also includes an inverter 108. The inverter 108 may include a p-type transistor and an n-type transistor connected in series between power and ground. However, any combination of passive and active devices operable to convert a logic-0 input to a logic-1 output and to convert a logic-1 input to a logic-0 output may be used.

Transistors P3 and N3 form a feedback loop with the inverter 108. The gates of the P3 and N3 transistors are connected to the output of the inverter 108. As a result, the inverter 108 may turn on either P3 or N3 depending on the output of the inverter 108. For example, if the output of the inverter 108 is a logic-0, P3 may turn on. Similarly, if the output of the inverter 108 is a logic-1, N3 may turn on.

When P3 is turned on, the input to the inverter 108 may be weakly held at logic-1. When N3 is turned on, the input to the inverter 108 may be weakly held at a logic-0. The input to the inverter 108 may be described as weakly held because the impedance of the series combination of transistors N1 and N2 can overdrive P3 and pull node 110 to a logic-0 state if both inputs 102, 104 are at a logic-1. Likewise, the series combination of transistors P1 and P2 can overdrive N3 and pull node 110 to a logic-1 state in the presence of logic-0 levels on both inputs 102, 104. Accordingly, the feedback loop formed by the inverter 108, P3, and N3 may be described as a weak feedback loop.

If the inputs 102, 104 are originally placed in the NULL state, the transistors P1 and P2 in the pull-up network may turn on, while the transistors N1 and N2 in the pull-down network may turn off. This may cause the output 106 to be placed in the NULL state. If either the input 102 or the input 104 is then placed in the DATA state, transistor P3 may remain turned on, which may keep the output 106 in the NULL state. However, if both the inputs 102, 104 are placed in the DATA state, the transistors P1 and P2 in the pull-up network may turn off, while the transistors N1 and N2 in the pull-down network may turn on. This may cause the output 106 to be placed in the DATA state.

If the inputs 102, 104 are originally placed in the DATA state, the transistors P1 and P2 in the pull-up network may turn off, while the transistors N1 and N2 in the pull-down network may turn on. This may cause the output 106 to be placed in the DATA state. If either the input 102 or the input 104 is then placed in the NULL state, transistor N3 may remain turned on, which may keep the output 106 in the DATA state. However, if both the inputs 102, 104 are placed in the NULL state, the transistors P1 and P2 in the pull-up network may turn on, while the transistors N1 and N2 in the pull-down network may turn off. This may cause the output 106 to be placed in the NULL state.

Figure 2:
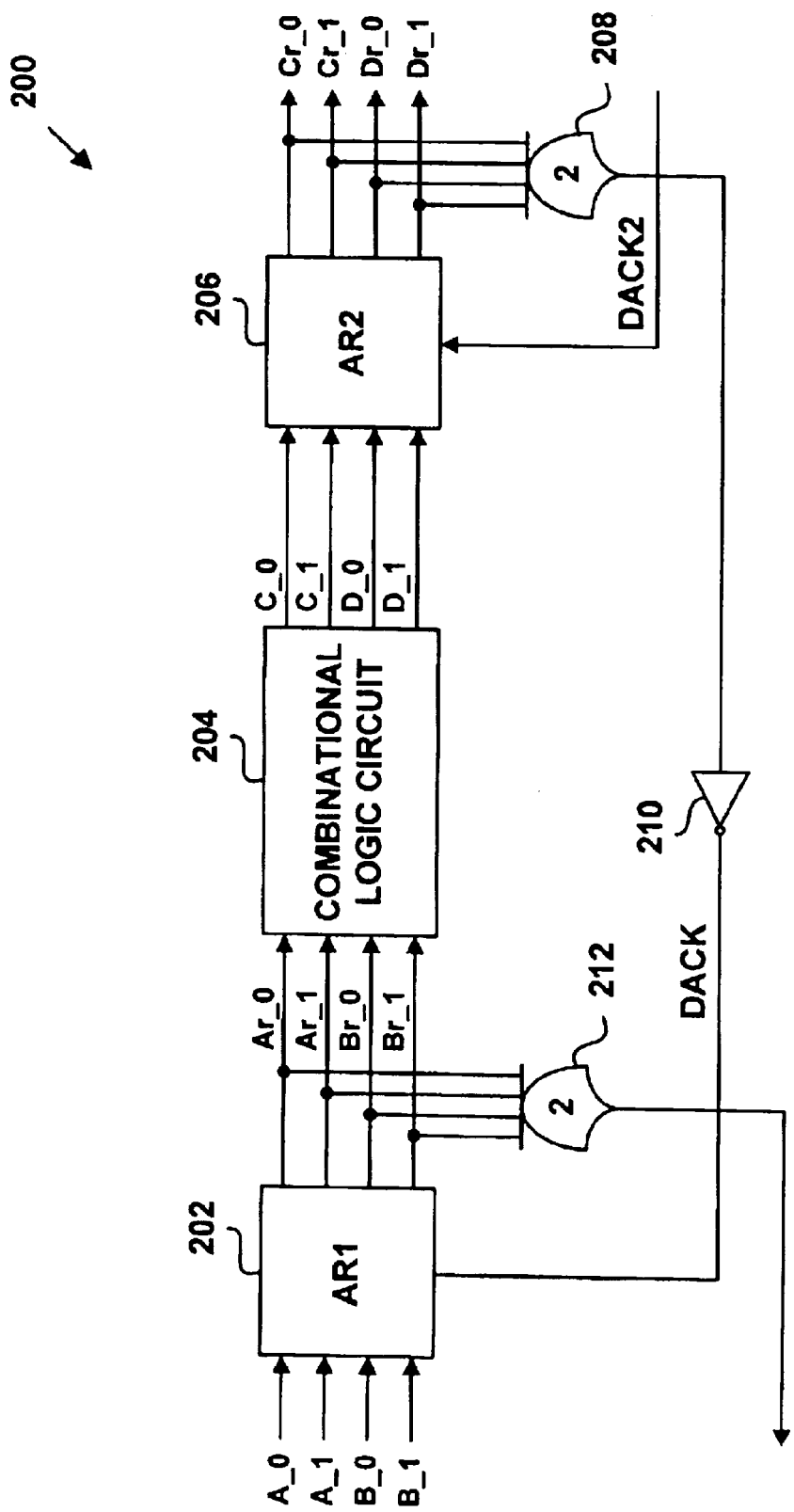
FIG. 2 is a schematic diagram of a typical NCL circuit, according to an exemplary embodiment.

FIG. 2 is a schematic diagram of a typical NCL circuit 200. The NCL circuit 200 includes an asynchronous combinational logic circuit 204 connected between a first asynchronous register (AR1) 202 and a second asynchronous register (AR2) 206. The outputs of the first and second asynchronous registers 202, 206 may be fed back to a previous asynchronous register through a feedback NCL gate, such as feedback NCL gates 208, 212, and an inverter, such as inverter 210. FIG. 2 depicts one stage of a typical NCL circuit. It is understood that additional stages having the same or different asynchronous combinational logic circuits may be included as part of a NCL circuit design.

The asynchronous combinational logic circuit 204 may include any combination of NCL gates that can be used to perform a variety of logic functions. Typically, each asynchronous combinational logic circuit 204 in a NCL circuit has a first asynchronous register at its input and a second asynchronous register at its output. The first and second asynchronous registers may store data. Additionally, the first and second asynchronous registers may monitor whether the asynchronous combinational logic circuit 204 is ready to accept new data. Once the asynchronous combinational logic circuit 204 indicates that it is ready to accept new data, data on the inputs to the first asynchronous register may be stored in the first asynchronous register and be provided to the asynchronous combinational logic circuit 204.

In the NCL circuit 200, a data state may be represented by two electrical signals, such as outputs C_0 and C_1 of the asynchronous combinational logic circuit 204. Taken together, the two electrical signals may represent one binary data value. The NCL circuit 200 may be designed such that legal data states may include NULL (e.g., C_0=logic-0, C_1=logic-0), DATA0 (e.g., C_0=logic-1, C_1=logic-0), and DATA1 (e.g., C_0=logic-0, C_1 =logic-1). The fourth possible state may be an ERROR state (e.g., C_0=logic-1, C_1=logic-1). The ERROR state may occur as a result of a transient fault, such as an SEU. Accordingly, the output pairs of the NCL circuit 200 (e.g., C_0 and C_1) may be considered to be mutually exclusive.

When a complete data set has been received from the asynchronous combinational logic circuit 204 and stored by the second asynchronous register 206, the second asynchronous register 206 may provide as an output DATA. When all of the outputs of the second asynchronous register 206 have evaluated to a DATA state and the NCL feedback gate 208 receives the DATA, the NCL feedback gate 208 provides a logic-1 output. For example in FIG. 2 when Cr and Dr are both in the DATA state then at least two of the four electrical signals Cr_0, Cr_1, Dr_0 and Dr_1 will be in the logic-1 state. The NCL feedback gates 208, 212 are 2-of-4 gates, therefore when two of the four electrical signals reach the logic-1 state, the output of the NCL feedback gates 208, 212 will change to the logic-1 (DATA) state.

The inverter 210 may convert the logic-1 value at the output of the NCL feedback gate 208 to a logic-0 value, providing a data acknowledge (DACK) signal to the first asynchronous register 202. In this example DACK is active low. The DACK signal may indicate to the first asynchronous register 202 that the asynchronous combinational logic circuit 204 is ready to receive a NULL wave front. The NULL wave front may occur when all the inputs to the asynchronous combinational logic circuit 204 are at a logic-0 level. In other words, A_0, A_1, B_0, B_1, and DACK must all be at a logic-0 level in order for the NULL wave front to propagate.

The NCL feedback gate 208 may continue to output a logic-1 value until all of its input values are NULL, which means that the second asynchronous register 206 has received and stored all NULL values. When the NCL feedback gate 208 receives the NULL wave front, the NCL feedback gate 208 provides a logic-0 output. The inverter 210 converts the logic-0 value to a logic-1 value, which provides a DACK signal at a logic-1 level to the first asynchronous register 202. The DACK signal may indicate to the first asynchronous register 202 that the asynchronous combinational logic circuit 204 is ready to receive a DATA wave front. The DATA wave front may occur when all the inputs to the asynchronous combinational logic circuit 204 contain DATA (e.g., DATA0 and DATA1). For example, when A and B have both entered the data state and DACK reaches a logic-1 level, then the DATA wave front may propagate to the output of the first asynchronous register 202 and through the asynchronous combinational logic circuit 204.

Figure 3:
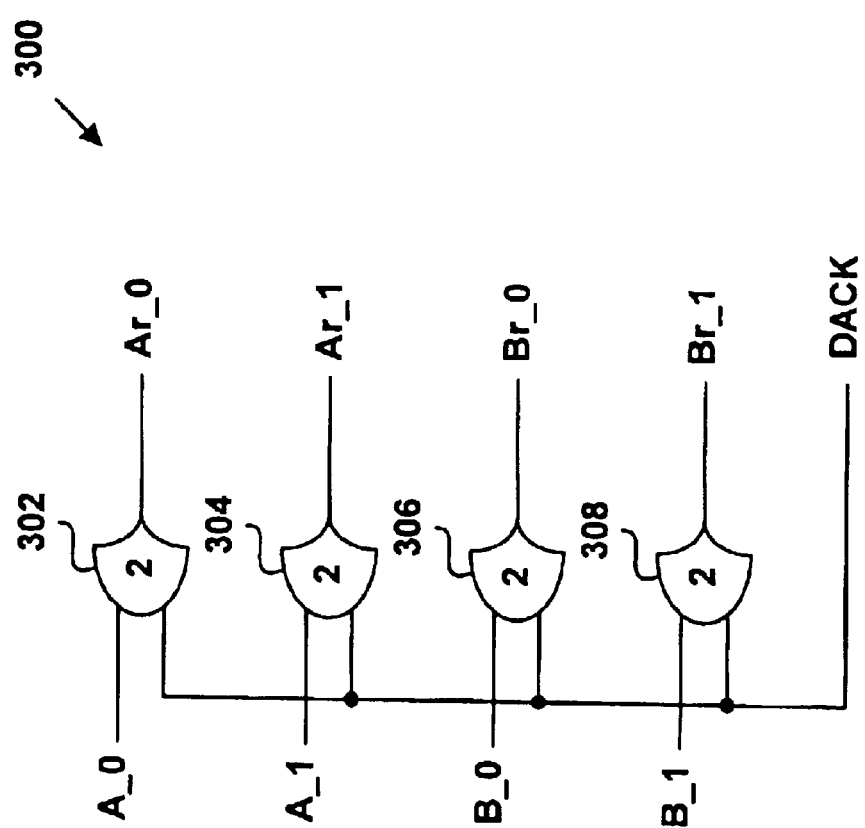
FIG. 3 is a schematic diagram of an asynchronous register, according to an exemplary embodiment.

FIG. 3 is a schematic diagram of an asynchronous register 300. The asynchronous register 300 may be substantially the same as the asynchronous registers 202, 206 depicted in FIG. 2. The asynchronous register 300 may include a bank of 2-of-2 NCL gates 302–308. In asynchronous register 300, the NCL gates 302–308 are known as 2-of-2 gates meaning that the output is designed to transition to the DATA state if at least two inputs are in the DATA state. While four NCL gates are depicted in FIG. 3, the asynchronous register 300 may have more or less than four NCL gates. The number of inputs to the asynchronous register 300 might determine the number of NCL gates in the asynchronous register 300, but other asynchronous register designs may also be used.

In this example, each NCL gate in the asynchronous register 300 may have two inputs and one output. One input to each of the NCL gates 302–308 may be a data input (e.g., A_0, A_1, B_0, and B_1), while the second input to each of the NCL gates 302–308 may be a control input (e.g., DACK). For example, the DACK signal may be the output of inverter 210 depicted in FIG. 2. Each of the outputs of the NCL gates 302–308 may be a registered data output (e.g., Ar_0, Ar_1, Br_0, and Br_1). It is understood that the asynchronous register 300 may include additional inputs and outputs.

The control signal, DACK, may indicate that the second asynchronous register 206 has received and stored DATA from the asynchronous combinational logic circuit 204 and is ready to receive a NULL wave front. This indication may be a result of the feedback NCL circuit 208 receiving the DATA input and providing a logic-1 output, which is then converted to a logic-0 by the inverter 210. The logic-0 DACK signal is then provided to the asynchronous register 300. When all inputs to each NCL gate in the bank of NCL gates 302–308 are in the NULL state, the NULL wave front may be transferred to the asynchronous combinational logic circuit 204.

Similarly, when the DACK signal equals logic-1 this may indicate that the second asynchronous register 206 has received and stored NULL from the asynchronous combinational logic circuit 204 and is ready to receive a DATA wave front. This indication may be a result of the feedback NCL circuit 208 receiving the NULL input and providing a logic-0 output, which is then converted to a logic-1 by the inverter 210. The logic-1 DACK signal is then provided to the asynchronous register 300. When the inputs to the bank of NCL gates 302–308 are in the DATA state, the DATA wave front may be transferred to the asynchronous combinational logic circuit 204.

If the NCL circuit 200 is used in applications that expose the circuit to radiation, the radiation may cause a transient fault, such as a radiation induced SEU. The SEU may cause the outputs of the asynchronous combinational logic circuit 204 to be placed in a NULL or DATA state independently of the states on the inputs. As a result, erroneous data may propagate to a circuit connected to the NCL circuit 200. Therefore, it would be beneficial to harden the asynchronous combinational logic circuit 204 from the effects of radiation.

SEU in an NCL circuit may cause the outputs to make an early transition to a state that appears to be valid DATA, only to subsequently transition to an ERROR state. Therefore it is important to wait until the asynchronous combinational logic circuit 204 has had enough time to completely evaluate before deciding whether the result is valid. Additionally, the NCL feedback gate 208 in FIG. 2 requires only that enough inputs reach the logic-1 (DATA) state in order for it to provide an active low DACK signal. There is no requirement that the DATA is valid. Therefore, it is important to qualify the DACK signal with a signal that indicates valid DATA.

To harden the asynchronous combinational logic circuit 204 from the effects of radiation, new data should be prevented from being latched into the first asynchronous register 202 until it has been determined that the asynchronous combinational logic circuit 204 has had enough time to propagate data to the output and no faults exist. Likewise, data on the output of a asynchronous combinational logic circuit 204 should not be allowed to propagate into the second asynchronous register 206 until it has been determined that the asynchronous combinational logic circuit 204 has had enough time to propagate data to the output and no faults exist. Accordingly, delaying data propagation into the second asynchronous register 206 until the previous data has had enough time to propagate to the output of the asynchronous combinational logic circuit 204 and establishing that no fault exists may harden the asynchronous combinational logic circuit 204.

Figure 4:
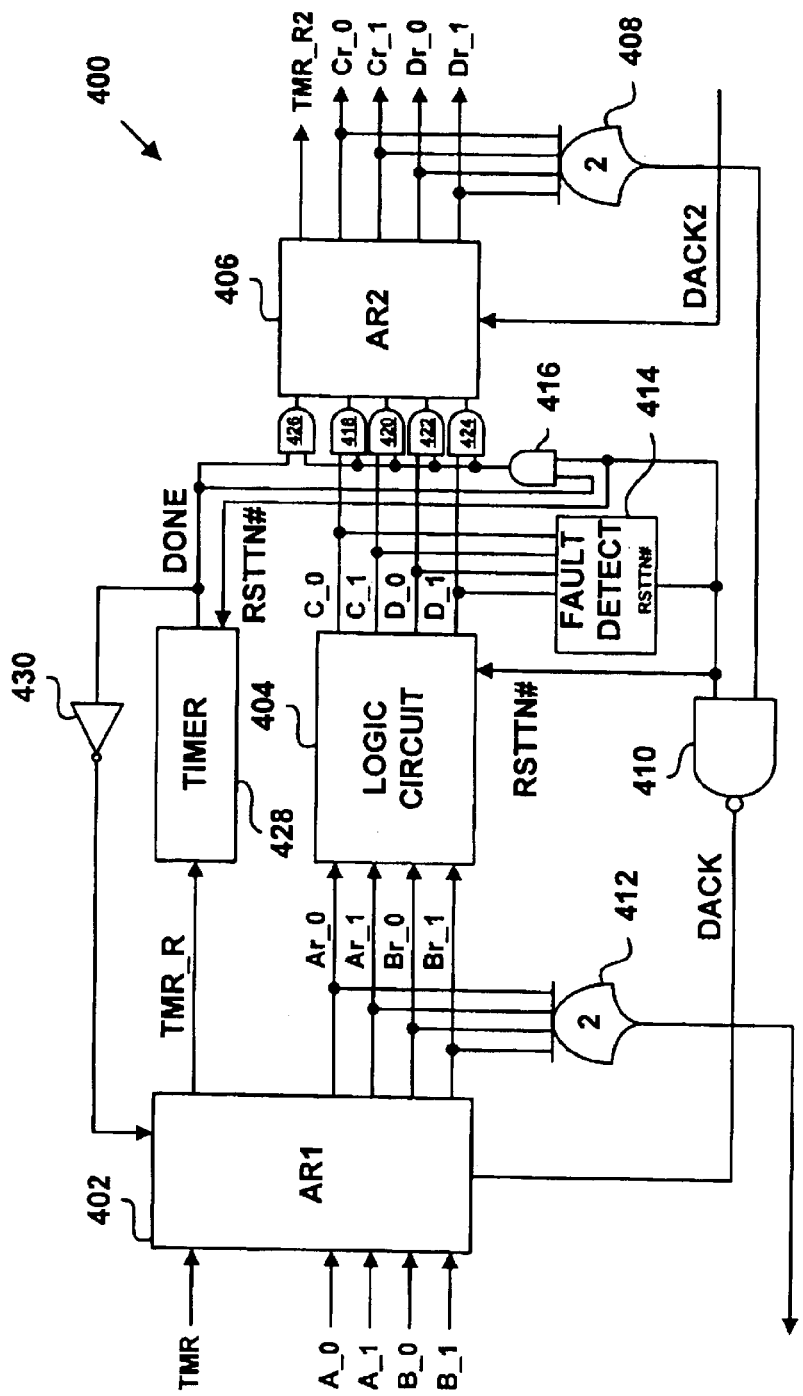
FIG. 4 is a schematic diagram of a hardened NCL circuit, according to an exemplary embodiment.

FIG. 4 is a schematic diagram of a hardened NCL circuit 400, according to an exemplary embodiment. The hardened NCL circuit 400 is similar to the typical NCL circuit 200 depicted in FIG. 2; however, additional circuitry has been provided to harden the asynchronous combinational logic circuit 204 from the effects of radiation. Similar to the NCL circuit 200, the hardened NCL circuit 400 includes an asynchronous combinational logic circuit 404 located between a first asynchronous register 402 and a second asynchronous register 406.

The outputs of the first and second asynchronous registers 402, 406 may be fed back to the previous asynchronous register through a feedback NCL gate, such as feedback NCL gates 408, 412. However, the inverter 210 may be replaced with a NAND gate 410. Additionally, the NCL circuit 400 includes a fault detector 414, a timer 428, an inverter 430, and six AND gates 416–426. Further, the first and second asynchronous registers 402 and 406 and the NCL gates within the asynchronous combinational logic circuit 404 may be modified as described below.

The fault detector 414 may be used to detect whether a fault caused by radiation has occurred. The fault may be detected by detecting the ERROR state at the output of the asynchronous combinational logic circuit 404. If the fault detector 414 detects a fault, the fault detector 414 may trigger a reset to the asynchronous combinational logic circuit 404. The reset to the asynchronous combinational logic circuit 404 may include clearing the fault and resetting the outputs of the asynchronous combinational logic circuit 404 to a valid data output based on data inputs provided by the first asynchronous register 402. The asynchronous combinational logic circuit 404 may provide inputs to the fault detector 414. Additionally, the fault detector 414 may provide a Reset to NULL (RSTTN#) output signal. The RSTTN# signal is connected to the NAND gate 410, the asynchronous combinational logic circuit 404, the AND gate 416 and the timer 428. The RSTTN# signal may remain at a logic-1 level unless a fault is detected. If a fault is detected, the RSTTN# signal may transition to a logic-0 level.

The RSTTN# signal and the output of the feedback NCL gate 408 may provide inputs to the NAND gate 410. The DACK signal may be provided as an output of the NAND gate 410. The DACK signal may function as described above with respect to FIG. 3 when the RSTTN# signal is at a logic-1 level, which indicates that no faults have been detected. However, when the RSTTN# signal is at a logic-0 level indicating a fault has been detected, the DACK signal may remain at a logic-1 level even if the feedback NCL gate 408 indicates that the asynchronous combinational logic circuit 404 is ready to receive a NULL wave front.

If DACK remains at a logic-1 level, then asynchronous register 402 may continue to retain DATA and the NULL wave front may not be propagated. Accordingly, the RSTTN# signal may prevent the DACK signal from clearing the first asynchronous register 402 when a fault is detected. Thus, data may be preserved in the first asynchronous register 402 as long as a fault is detected. As a result, the asynchronous combinational logic circuit 404 may be able to reset itself to a NULL output followed by a reevaluation based on the inputs that are held in the asynchronous register 402.

While the asynchronous combinational logic circuit 404 is propagating the NULL wave front, the timer 428 may also propagate a NULL wave front, returning DONE to a logic-0 level. When a NULL wave front has been propagated through the asynchronous combinational logic circuit 404 and the timer 428, the fault detector 414 will return the RSTTN# signal to a logic-1 level. Once the RSTTN# signal transitions to the logic-1 level, the asynchronous combinational logic circuit 404 may reevaluate itself based on the data preserved in the first asynchronous register 402. The fault detector 414 is described in more detail below.

The timer circuit 428 may be used to ensure that data has had time to propagate to the outputs of the asynchronous combinational logic circuit 404. The timer circuit 428 may provide an output, DONE, indicating that enough time has passed for data to propagate to the outputs of the asynchronous combinational logic circuit 404. The DONE signal may be provided to the first and second asynchronous registers 402, 406 through additional logic circuitry. The DONE signal may provide a logic-0 output until enough time has passed for data to pass through each of the NCL gates in the asynchronous combinational logic circuit 404. When enough time has passed, the DONE signal may transition to a logic-1 value. The timer circuit 428 is described in more detail below.

The DONE signal may be provided as an input to the AND gate 416. Another input to the AND gate 416 may be the RSTTN# signal from the fault detector 414. The AND gate 416 may provide a logic-0 output until both the DONE signal and the RSTTN# signal transition to logic-1 levels. Accordingly, the output of the AND gate 416 may transition to a logic-1 level when enough time has passed for data to pass through each of the NCL gates in the asynchronous combinational logic circuit 404 and no faults were detected by the fault detector 414.

The output of the AND gate 416 may be connected to an input of each of the AND gates 418–426. The asynchronous combinational logic circuit 404 may provide another input to the AND gates 418–426. Data may be allowed to propagate into the second asynchronous register 406 if the output of the AND gate 416 is at a logic-1 level. Thus, data on the output of the asynchronous combinational logic circuit 404 may be prevented from propagating into the second asynchronous register 406 until it has been determined that the asynchronous combinational logic circuit 404 has had enough time to propagate data to the outputs and no faults exist. Accordingly, the AND gate 416 may prevent bad data caused by SEU from propagating into the second asynchronous circuit 406.

The DONE signal may also be provided as an input to the inverter 430. While data is propagating through the asynchronous combinational logic circuit 404, the logic-0 level of the DONE signal may be converted to a logic-1 level by the inverter 430. The logic-1 level may then be provided as an input to the first asynchronous register 402. Similarly, when the DONE signal transitions to a logic-1 level, indicating that enough time has elapsed for data to propagate to the outputs of the asynchronous combinational logic circuit 404, the inverter 430 may provide a logic-0 output. The first asynchronous register 402 may include a bank of 3-of-3 NCL gates, as depicted in FIG. 5.

Figure 5:
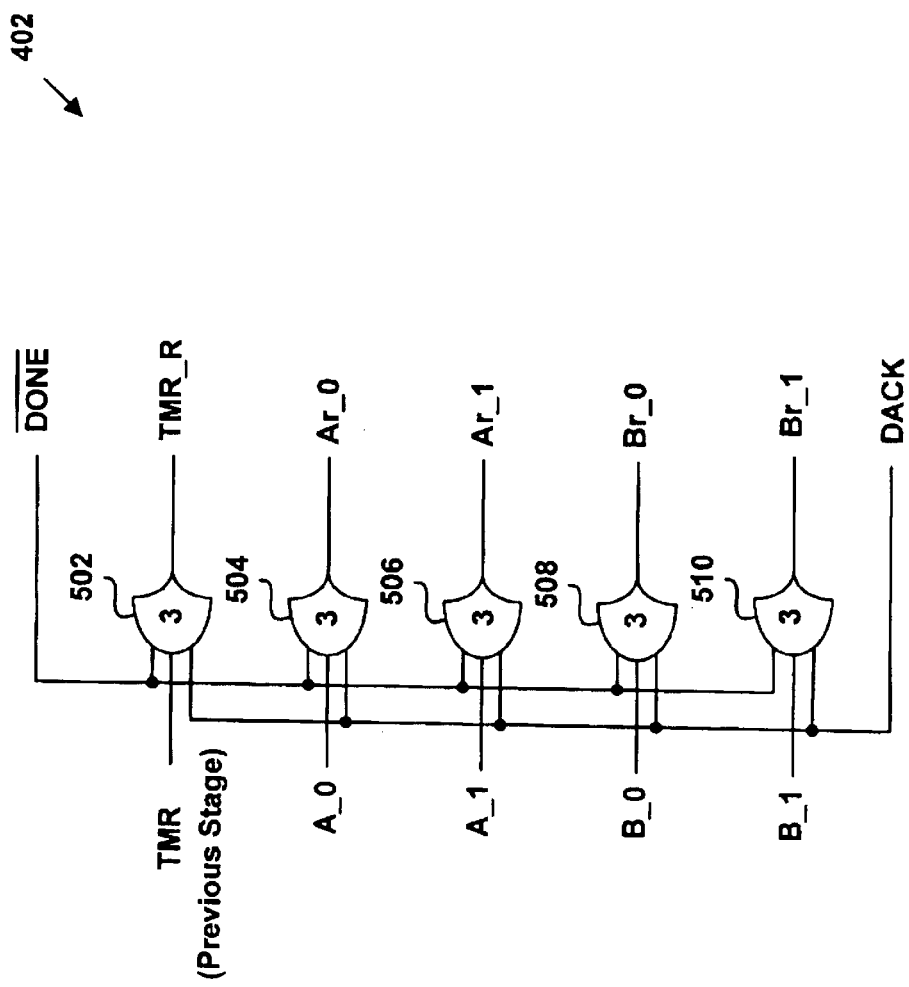
FIG. 5 is a schematic diagram of an asynchronous register used in the hardened NCL circuit depicted in FIG. 4, according to an exemplary embodiment.

FIG. 5 is a schematic diagram of the first asynchronous register 402 used in the hardened NCL circuit 400 depicted in FIG. 4. The first asynchronous register 402 is similar to the asynchronous register 300 depicted in FIG. 3, except the NCL gates may include three inputs instead of two. Additionally, the first asynchronous register 402 may include an additional NCL gate. The second asynchronous register 406 may be substantially the same as the first asynchronous register 402 with the exception that the number of inputs may be different depending on the number of outputs of the asynchronous combinational logic circuit 404.

NCL gates 504–510 may receive one data input (e.g., A_0, A_1, B_0, and B_1) and two control inputs (e.g., DACK and $\overline{\text{DONE}}$). NCL gate 502 may receive one timer input (TMR) from a previous NCL stage and two control inputs (e.g., DACK and $\overline{\text{DONE}}$). The TMR signal from the previous NCL stage may be derived from the AND of the $\overline{\text{DONE}}$ signal and the RSTTN# signal generated from the previous NCL stage. NCL gate 502 may provide as an output TMR_R. As described above, the DACK signal may remain at a logic-1 level if the RSTTN# signal is at a logic-0 level, indicating that a fault has been detected.

Adding the $\overline{\text{DONE}}$ signal as a control input to the NCL gates 504–510 may prevent clearing the data stored in the first asynchronous register 402. When the RSTTN# signal has transitioned to a logic-1 state and the $\overline{\text{DONE}}$ signal to a logic-0 state, indicating that enough time has elapsed for data to propagate to the output of the asynchronous combinational logic circuit 404 and that no fault exists, the first asynchronous register 402 may receive and store a NULL wave front. Thus, data may remain stored in the first asynchronous register 402 if enough time has not elapsed for data to propagate to the output of the asynchronous combinational logic circuit 404 or if a fault is detected. Thus, the asynchronous combinational logic circuit 404 may use the data in the first asynchronous register 402 to reevaluate itself after an SEU event.

Figure 6:
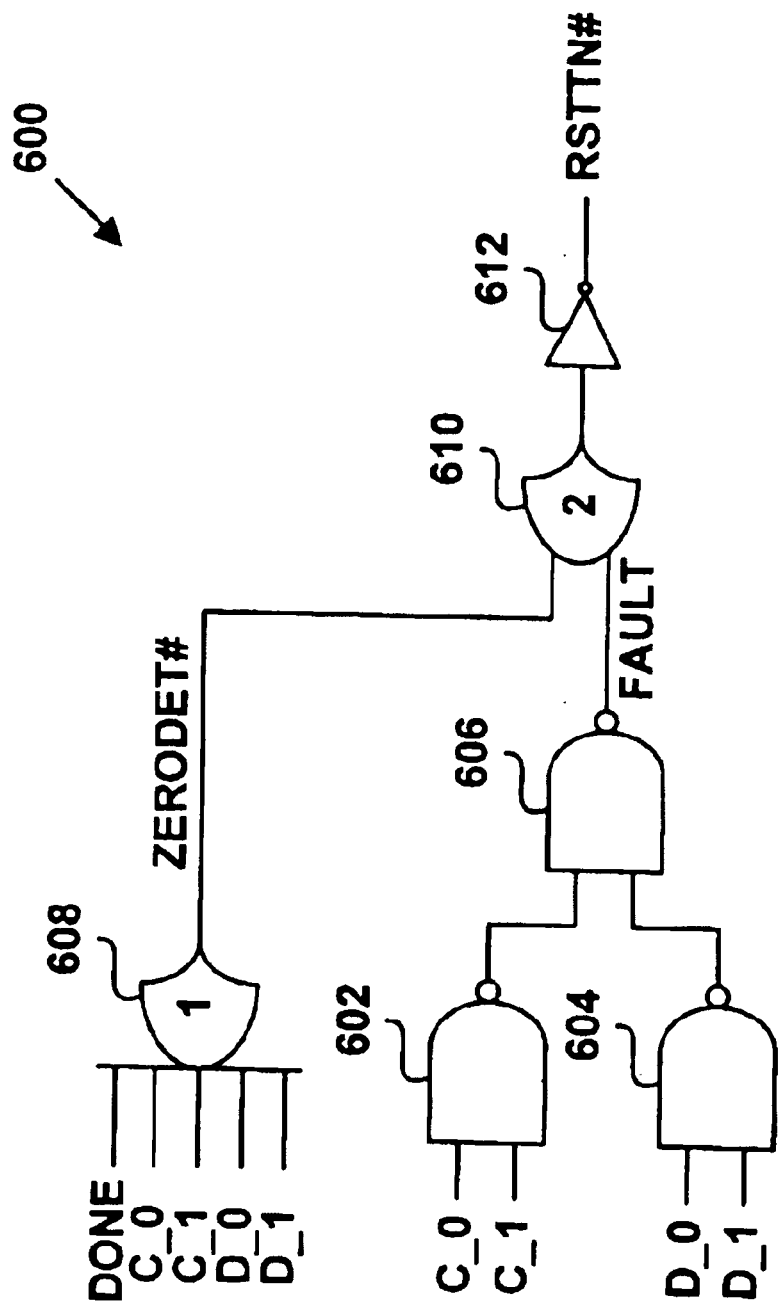
FIG. 6 is a schematic diagram of a fault detector, according to an exemplary embodiment.

FIG. 6 is a schematic diagram of a fault detector 600, according to an exemplary embodiment. The fault detector 600 may be substantially the same as the fault detector 414 depicted in FIG. 4. The fault detector 600 may include three NAND gates 602, 604 and 606, one 1-of-5 NCL gate 608, one 2-of-2 NCL gate 610 and one inverter 612. The asynchronous combinational logic circuit 404 may provide the inputs to the NAND gates 602, 604 and the NCL gate 608. The timer circuit 428 may provide one additional input to the NCL gate 608 (DONE). Outputs from the NAND gates 602, 604 may provide inputs to the NAND gate 606. Outputs from the NAND gate 606 and NCL gate 608 may provide inputs to the NCL gate 610. The inverter 612 may invert the signal at the output of the NCL gate 610 to create output signal RSTTN#. Other fault detector circuit designs may be used.

The fault detector 600 may be designed such that the RSTTN# signal stays at a logic-1 level unless both inputs to at least one of the NAND gates 602, 604 are at logic-1 levels. If both of the inputs to one of the NAND gates 602, 604 are at logic-1 levels, the RSTTN# signal may transition to a logic-0 level. In addition, once the output signal RSTTN# has transitioned to the active state of logic-0, the RSTTN# signal may not transition to logic-1 until all inputs to the NCL gate 608 have returned to logic-0 (NULL state). The design for the fault detector 600 as shown in FIG. 6 is appropriate for an asynchronous combinational logic circuit with 4 electrical outputs as indicated by the 4 signals C_0, C_1, D_0, and D_1. The design could be expanded to accommodate asynchronous combinational logic circuits with more than 4 electrical outputs. The fault detector 600 may be described as a mutual exclusivity (MUTEX) fault detector.

Figure 7:
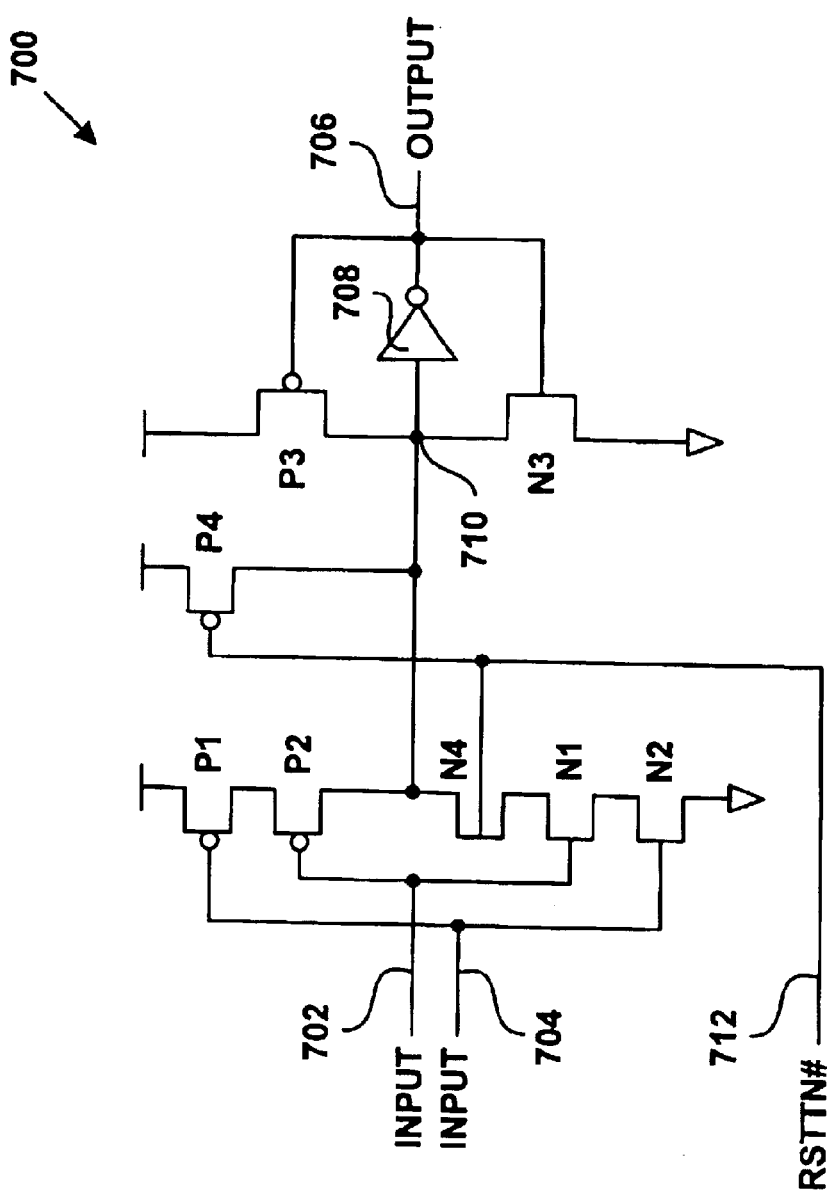
FIG. 7 is a schematic diagram of a resettable NCL gate circuit, according to an exemplary embodiment.

FIG. 7 is a schematic diagram of a resettable NCL gate circuit 700, according to an exemplary embodiment. The resettable NCL gate circuit 700 is similar to the NCL gate circuit 100 described above with reference to FIG. 1. However, the resettable NCL gate circuit 700 includes two additional transistors, P4 and N4, and receives one additional input, RSTTN# signal 712. The transistors P4 and N4 are depicted in FIG. 7 as CMOS transistors; however, other transistor types may be employed. The RSTTN# signal 712, which is an output of the fault detector 600, may be connected to a gate of each the P4 and N4 transistors. The P4 transistor may be connected in the pull-up network between power and node 710, while the N4 transistor may be connected in the pull-down network between the N1 transistor and node 710.

When the RSTTN# signal 712 is at a logic-1 level, indicating that no fault has been detected, P4 may be turned off, while N4 may be turned on. As a result, the resettable NCL gate circuit 700 may operate in a similar manner as the typical NCL gate circuit 100. However, when the RSTTN# signal 712 is at a logic-0 level, indicating that a fault has been detected, the operation of the resettable NCL gate circuit 700 may be different than the operation of the typical NCL gate circuit 100. When the RSTTN# signal 712 is at a logic-0 level, P4 may be turned on, while N4 may be turned off. When N4 is turned off, transistors N1 and N2 may be prevented from pulling node 710 to a logic-0 level. Thus, P4 may pull node 710 to a logic-1 level.

For example, if the RSTTN# signal 712 is at a logic-0 level and the inputs 702, 704 are initially placed in the NULL state, the P1 and P2 transistors may turn on, while the N1 and N2 transistors may turn off. This may cause the output 706 to be placed in the NULL state. If either the input 702 or the input 704 is then placed in the DATA state, transistors P3 and P4 may remain turned on, which may keep the output 706 in the NULL state. However, if both the inputs 702, 704 are placed in the DATA state, the P1 and P2 transistors may turn off, while the N1 and N2 transistors may turn on. However, because N4 is turned off, the output 706 will not be placed in the DATA state. The P4 transistor may ensure that the output 706 remains in the NULL state while the RSTTN# signal 712 remains at a logic-0 level.

As a result of the modifications to the resettable NCL gate circuit 700, a NULL wave front may propagate through the asynchronous combinational logic circuit 404, which may clear the fault, returning the RSTTN# signal 712 to a logic-1 level. As described above, data may be preserved in the first asynchronous register 402 by preventing the DACK signal from clearing the first asynchronous register 402. Accordingly, the asynchronous combinational logic circuit 404 may reset itself to a valid data output based on the data inputs provided by the first asynchronous register 402.

Figure 8:
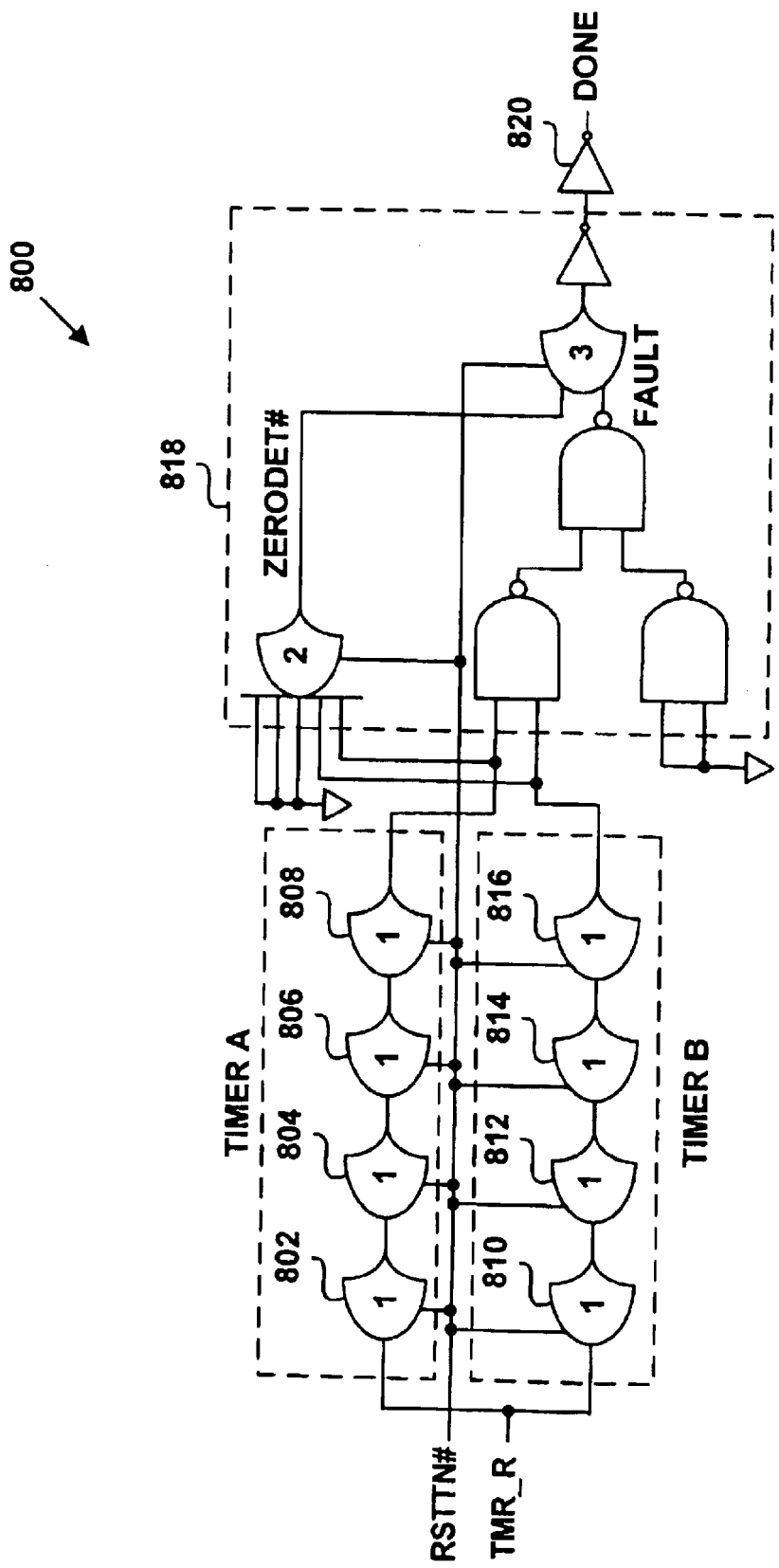
FIG. 8 is a schematic diagram of a timer circuit, according to an exemplary embodiment.

FIG. 8 is a schematic diagram of a timer circuit 800, according to an exemplary embodiment. The first asynchronous register 402 may provide an input TMR_R to the timer circuit 800. The timer input TMR_R is the output of the 3-of-3 NCL gate 502 as shown in FIG. 5. Additionally, the fault detector may provide an input RSTTN# to the timer circuit 800. The timer input RSTTN# is the output of the fault detector 600 as shown in FIG. 6. Further, the timer circuit 800 may provide an output, DONE, indicating that enough time has passed for data to propagate to the output of the asynchronous combinational logic circuit 404. The DONE signal is then provided to the first and second asynchronous registers 402, 406 through additional logic circuitry.

The timer circuit 800 may include at least one chain of NCL gates 802–808 (e.g., Timer A). The chain of NCL gates may include at least as many NCL gates as found in the longest path in the asynchronous combinational logic circuit 404. Alternatively, the timer circuit 800 may include a first chain of NCL gates 802–808 (e.g., Timer A) and a second chain of NCL gates 810–816 (e.g., Timer B). In this embodiment, the length of the first chain of NCL gates 802–808 may be the same length as the second chain of NCL gates 810–816, which may be at least as many NCL gates as found in the longest path in the asynchronous combinational logic circuit 404. Another embodiment may involve using the same topology of NCL gates as is found in the longest path in the asynchronous combinational logic circuit 404, instead of chains 802–808 and 810–816, the purpose being to try to match as closely as possible the longest delay through the asynchronous combinational logic circuit 404.

The timer circuit 800 may also include a fault detector 818, similar to the fault detector 600 depicted in FIG. 6, and an inverter 820. The fault detector 818 may receive one input from the first chain of NCL gates 802–808 and one input from the second chain of NCL gates 810–816. The output of the fault detector 818 may provide an input to the inverter 820. The inverter 820 may provide an output indicating that enough time has passed for data to propagate to the output of the asynchronous combinational logic circuit 404 (e.g., DONE). Specifically, the output of the inverter 820 may provide a logic-0 output until the outputs of the first chain of NCL gates 802–808 and the second chain of NCL gates 810–816 are both at a logic-1 level. When the outputs of the first and second chain of NCL gates 802–816 transition to a logic-1 level, the output of the inverter 822 may also transition to a logic-1 level.

The timer circuit 800 may also include a means to reset the timer circuit 800 and deassert the DONE signal. When a fault is detected a reevaluation of the combinational logic may be performed. Prior to this reevaluation, the timer circuit 800 should be reset to the NULL state or a spurious assertion of the DONE signal may occur during the reevaluation. Upon detection of a fault, all stages of the timer circuit 800 should be immediately reset to the NULL state. The reset of the timer circuit 800 should be completed before the fault has been cleared and RSTTN# deasserted, or the timer circuit 800 may not be completely reset. Thus, the RSTTN# signal may be used to substantially simultaneously reset all stages of the timer circuit 800 to NULL, rather than propagating a NULL wave from the first timer stage.

Other timer circuit designs may be used. In particular, although it may be preferable to have an added timer circuit 800, in some applications a long path in pre-existing circuitry, such as the asynchronous combinational logic circuit 404, may be used as a timer. The long path in the preexisting circuitry may protect against transient faults on all paths except the long path used as the timer. If a long path in the preexisting circuitry is used as a timing circuit, the timer 428 depicted in FIG. 4 may not be necessary, which may simplify the circuitry of the NCL circuit 400. In this embodiment, the DONE signal may be generated through an OR combination of the two logic circuit outputs associated with the long path in the pre-existing circuitry.

By modifying the typical NCL circuit as described above, the asynchronous combinational logic circuit may be hardened from the effects of radiation. The hardened asynchronous combinational logic circuit as described above may be able to detect and recover from a fault caused by SEU. As a result of the hardening, the asynchronous combinational logic circuit may be used in applications in which radiation is present.

It should be understood that the illustrated embodiments are exemplary only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A system for hardening an asynchronous combinational logic circuit against transient faults, comprising in combination:
   a first asynchronous register for receiving inputs to be provided to the asynchronous combinational logic circuit, wherein outputs of the first asynchronous register are connected to inputs of the asynchronous combinational logic circuit;
   a second asynchronous register for receiving outputs from the asynchronous combinational logic circuit;
   a timer operable to ensure data has had sufficient time to propagate through the asynchronous combinational logic circuit; and
   a fault detector connected to the outputs of the asynchronous combinational logic circuit, wherein the fault detector is operable to detect a transient fault, and wherein the fault detector resets the asynchronous combinational logic circuit if the transient fault is detected.

2. The system of claim 1, wherein the asynchronous combinational logic circuit is a null convention logic circuit.

3. The system of claim 1, wherein the transient fault is a single event upset.

4. The system of claim 1, wherein the first asynchronous register and the second asynchronous register include at least one null convention logic gate.

5. The system of claim 1, wherein the timer includes at least one chain of null convention logic gates.

6. The system of claim 5, wherein the at least one chain of null convention logic gates includes at least as many null convention logic gates as found in a longest path of null convention logic gates in the asynchronous combinational logic circuit.

7. The system of claim 5, wherein the timer includes at least one null convention logic gate operable to create a propagation delay from input to output such that the propagation delay of the timer is at least equal to the longest propagation delay through the asynchronous combinational logic circuit.

8. The system of claim 5, wherein the timer includes at least one resettable null convention logic gate.

9. The system of claim 5, wherein the timer further includes a fault detector and an inverter, wherein an output of the fault detector provides an input to the inverter.

10. The system of claim 1, wherein the timer is a long path in pre-existing circuitry.

11. The system of claim 10, wherein the pre-existing circuitry is the asynchronous combinational logic circuit.

12. The system of claim 1, wherein the fault detector includes a first NAND gate, a second NAND gate, a third NAND gate, a first null convention logic gate, a second null convention logic gate, and an inverter.

13. The system of claim 12, wherein an output of the first NAND gate and an output of the second NAND gate provide inputs to the third NAND gate, and wherein an output of the third NAND gate provides a fault signal.

14. The system of claim 13, wherein the fault signal provides a first input to the first null convention logic gate, and wherein the fault signal causes an output of the first null convention logic gate to transition to a logic-1 DATA state if a fault is detected.

15. The system of claim 12, wherein an output of the second null convention logic gate provides a second input to the first null convention logic gate, and wherein the first null convention logic gate transitions to a logic-0 NULL state when all inputs to the fault detector have transitioned to the logic-0 NULL state.

16. The system of claim 12, wherein an output of the first null convention logic gate provides an input to the inverter, and wherein the inverter inverts a fault signal provided by the first null convention logic gate to create an active low Reset to NULL (RSTTN#) signal.

17. The system of claim 1, wherein the fault detector is a mutual exclusivity fault detector.

18. The system of claim 1, wherein the fault detector provides as an output a Reset to NULL (RSTTN#) signal.

19. The system of claim 18, wherein the RSTTN# signal causes a NULL wave front to propagate through the asynchronous combinational logic circuit clearing the transient fault.

20. The system of claim 18, wherein the RSTTN# signal causes data to be preserved in the first asynchronous register.

21. The system of claim 20, wherein the asynchronous combinational logic circuit reevaluates itself using the data preserved in the first asynchronous register.

22. A system for hardening a null convention logic circuit against single event upset, comprising in combination:
   a first asynchronous register for receiving inputs to be provided to the null convention logic circuit, wherein outputs of the first asynchronous register are connected to inputs of the null convention logic circuit, and wherein the first asynchronous register includes at least one null convention logic gate;
   a second asynchronous register for receiving outputs from the null convention logic circuit, and wherein the second asynchronous register includes at least one null convention logic gate;
   a timer operable to ensure data has had sufficient time to propagate through the null convention logic circuit, wherein the timer includes at least one chain of null convention logic gates, wherein the at least one chain of null convention logic gates includes at least as many null convention logic gates as found in a longest path of null convention logic gates in the null convention logic circuit, wherein the timer further includes a fault detector and an inverter, and wherein an output of the fault detector provides an input to the inverter; and
   a mutual exclusivity fault detector connected to the outputs of the null convention logic circuit, wherein the mutual exclusivity fault detector is operable to detect a single event upset, wherein the mutual exclusivity fault detector resets the null convention logic circuit if the single event upset is detected, wherein the mutual exclusivity fault detector includes a first NAND gate, a second NAND gate, a third NAND gate, a first null convention logic gate, a second null convention logic gate, and an inverter, wherein an output of the first NAND gate and an output of the second NAND gate provide inputs to the third NAND gate, wherein an output of the third NAND gate provides a fault signal as a first input to the first null convention logic gate, wherein the fault signal causes an output of the first null convention logic gate to transition to a logic-1 DATA state if a fault is detected, wherein an output of the second null convention logic gate provides a second input to the first null convention logic gate, wherein the first null convention logic gate transitions to a logic-0 NULL state when all inputs to the fault detector have transitioned to the logic-0 NULL state, wherein an output of the first null convention logic gate provides an input to the inverter, and wherein the inverter inverts a fault signal provided by the first null convention logic gate to create an active low Reset to NULL (RSTTN#) signal.

23. The system of claim 22, wherein the RSTTN# signal causes a NULL wave front to propagate through the null convention logic circuit clearing the single event upset.

24. The system of claim 22, wherein the RSTTN# signal causes data to be preserved in the first asynchronous register.

25. The system of claim 24, wherein the null convention logic circuit reevaluates itself using the data preserved in the first asynchronous register.

26. A method for hardening an asynchronous combinational logic circuit against transient faults, comprising in combination:

detecting a transient fault;

preserving data in a first asynchronous register;

preventing an output of the asynchronous combinational logic circuit from propagating into a second asynchronous register;

propagating a NULL wave front through the asynchronous combinational logic circuit; and reevaluating the asynchronous combinational logic circuit using the data preserved in the first asynchronous register.

27. The method of claim 26, wherein the transient fault is a single event upset.

28. The method of claim 26, wherein detecting a transient fault comprises connecting a fault detector to the output of the asynchronous combinational logic circuit.

29. The method of claim 28, wherein the fault detector includes a first NAND gate, a second NAND gate, a third NAND gate, a first null convention logic gate, a second null convention logic gate, and an inverter.

30. The method of claim 29, wherein an output of the first NAND gate and an output of the second NAND gate provide inputs to the third NAND gate, and wherein an output of the third NAND gate provides a fault signal.

31. The method of claim 30, wherein the fault signal provides a first input to the first null convention logic gate, and wherein the fault signal causes an output of the first null convention logic gate to transition to a logic-1 DATA state if a fault is detected.

32. The method of claim 29, wherein an output of the second null convention logic gate provides a second input to the first null convention logic gate, and wherein the first null convention logic gate transitions to a logic-0 NULL state when all inputs to the fault detector have transitioned to the logic-0 NULL state.

33. The method of claim 29, wherein an output of the first null convention logic gate provides an input to the inverter, and wherein the inverter inverts a fault signal provided by the first null convention logic gate to create an active low Reset to NULL (RSTTN#) signal.

34. The method of claim 24, wherein the fault detector is a mutual exclusivity fault detector.

35. The method of claim 26, wherein preserving data in the first asynchronous register comprises disabling a data acknowledge control signal.

36. The method of claim 26, wherein the first and second asynchronous registers include at least one null convention logic gate.

37. The method of claim 26, wherein preventing the output of the asynchronous combinational logic circuit from propagating into the second asynchronous register comprises preventing data from entering the second asynchronous register until the data has enough time to propagate through the asynchronous combinational logic circuit and no transient fault is detected.

38. The method of claim 26, wherein propagating a NULL wave front results in outputs of the asynchronous combinational logic circuit transitioning to a logic-0 level.

39. The method of claim 26, wherein reevaluating the asynchronous combinational logic circuit comprises propagating the data in the first asynchronous register to outputs of the asynchronous combinational logic circuit.

40. The method of claim 26, wherein the asynchronous combinational logic circuit is a null convention logic circuit.

* * * * *